United States Patent [19]

Regnault

[11] Patent Number: 4,910,529

[45] Date of Patent: Mar. 20, 1990

[54] MULTIFUNCTION CELL WITH A VARIABLE VOLUME CHAMBER AND A FLUID SUPPLY CIRCUIT FOR AN INK JET PRINTING HEAD

[75] Inventor: Luc Regnault, Bourg Les Valence, France

[73] Assignee: Imaje SA, Bourg Les Valence, France

[21] Appl. No.: 127,767

[22] Filed: Dec. 2, 1987

[30] Foreign Application Priority Data

Dec. 10, 1986 [FR] France ................................ 86 17385
Aug. 26, 1987 [FR] France ................................ 87 12008

[51] Int. Cl.⁴ ........................ G01D 15/18; F17D 1/00; F04B 49/00; F16K 31/02

[52] U.S. Cl. ................................ 346/75; 346/140 R; 137/12; 137/92; 251/129.04; 417/18

[58] Field of Search ............... 346/75, 146 R; 417/18; 137/12, 92; 251/129.04

[56] References Cited

U.S. PATENT DOCUMENTS 3,855,129 12/1974 Abrahams et al. ............ 210/198 C
3,990,295 11/1976 Renovanz et al. ..................... 73/55
4,121,222 10/1978 Diebold et al. ...................... 346/75
4,270,133 5/1981 Shimazawa et al. .......... 346/140 R
4,314,264 2/1982 Bok et al. ........................ 346/140 R
4,318,114 3/1982 Huliba ........................... 346/140 R
4,357,617 11/1982 Shimazawa et al. .......... 346/146 R
4,359,312 11/1982 Funke et al. ........................ 417/18
4,464,668 8/1984 Komai et al. ........................ 346/75

FOREIGN PATENT DOCUMENTS 55-161660 12/1980 Japan ............................. 346/140 R

*Primary Examiner*—B. A. Reynolds
*Assistant Examiner*—Gerald E. Preston
*Attorney, Agent, or Firm*—Oblon, Spivak, McClelland, Maier & Neustadt

[57] ABSTRACT

Disclosed is a cell having a variable volume chamber and a fluid supply circuit for an ink jet printing head which is equipped therewith, the cell including a variable volume chamber (1) connected to a pressure sensor (5) and to at least a pair of valves (7, 9) each associated with a restriction (8, 10); the variation of volume being obtained by a piston actuated by an eccentric (3) secured to the rotor of a motor (4).

2 Claims, 11 Drawing Sheets

MULTIFUNCTION CELL WITH A VARIABLE VOLUME CHAMBER AND A FLUID SUPPLY CIRCUIT FOR AN INK JET PRINTING HEAD

BACKGROUND OF THE INVENTION

1. Field of the Invention:

The invention relates to a cell having a variable volume chamber capable of providing several functions such as the functions of generating a fluid flow, measuring viscosity, homogeneity of the fluid, temperature, positioning of the rotor of a motor, etc.

It also relates to the application of such cells adapted so that they lead to the construction of a hydraulic circuit for supplying a continuous ink jet printing head, the essential quality of which circuit is, through the use of such cell, that it is extremely compact for high operational and reliability performances.

Although the application to ink jets of a cell according to the invention is limitative, it is this application which will be described in greater detail in the following description. We find in fact an illustration of the main functions which such a cell may accomplish taken separately or in combination with another cell. It should be recalled here what are the particular requirements which a circuit must comply with for supplying a continuous ink jet printing head with ink. It is a question more particularly:

- of generating an ink jet whose flow rate is generally less than 20 $cm^3$/min and this at a pressure which may reach 4 bars;
- of residual fluctuations in the supply pressure less than 1%;
- of recovering and recycling the whole of the ink flow generated not used for printing;
- the possibility of using inks with very volatile solvents making rapid drying possible on non porous materials, such as metal or glass for example;
- high reliability;
- completely automatic operation in an industrial environment, without maintenance and without a demanding cleaning procedure before prolonged shut down of the supply circuit.

2. Discussion of the Background:

In the ink jet marking printers known at present, different solutions have been chosen for complying with the above expressed requirements. For example gear pumps are used for providing the functions of pressurizing the jet and depressurizing the gutter for recovery of the jet, cooperating with integrated means for measuring viscosity and adding solvents when the ink used includes volatile solvents. A supply circuit of this type is described in the French patent application Ser. No. 8316 440 filed by the applicant and published under the number 2 553 341. Such an architecture, although performing very well and adapted to certain applications, may however have some drawbacks. Among others, gear pumps, even of small size, are not well adapted to generating small flow rates of medium pressure, such as those which are required in the continuous jet technique. This type of pump, by its construction, has internal leaks due to the necessary functional mechanical clearances: these leaks are such that the pump, in order to operate under good conditions, must generate a real flow rate very appreciably greater than that which is required for the jet. High flow rates at the pressures required involve mechanical and electric powers without any common measure with what is required for the jet, and so overheating, over dimensioned ventilation and electric supply.

Furthermore, the reliability of this type of pump, for this application, is very modest for the materials compatible with light solvents, such as methyl ethyl ketone, are rare. The gears are often made from Teflon, which material has limited mechanical wear characteristics.

For the correct operation of such a circuit, it is necessary to use multiple sensors, such as pressure sensors, level sensors with immersed probes, viscosimeter, temperature sensors for correcting the viscosity of the ink, considerable piping, etc. In addition, the cleaning procedures are tedious.

In another type of equipment, compressed air is used for pressurization. If it is industrial compressed air, it must be carefully filtered. The depression function for recovering the jet is obtained by venturi effect. The major drawback of this supply system is the transfer of ink from the depressurized part to the pressurized part, which requires the provision of multiple transfer air locks. Furthermore, if compressed air is not available, a compressor is necessary.

SUMMARY OF THE INVENTION

The purpose of the present invention is to overcome these drawbacks and it relates to a new device, called a cell in the rest of the description, which cell makes it possible to accomplish a large number of functions, either alone or in combination with another one.

On the one hand, such a cell in cooperation with the different fluid, ink and solvent reservoirs is capable of generating a fluid flow for supplying a conventional continuous ink jet printing head. On the other hand, it is also capable of cooperating with means for recovering the ink jet not used, for recycling it.

Finally, such a cell may be adapted for accomplishing, besides these functions already mentioned, those of measuring a viscosity, of controlling the homogeneity of a fluid, of controlling levels, etc.

Two of such cells in accordance with the invention may be adapted for forming a complete supply circuit which requires the use of a single motor and a single sensor. Thus an extremely compact architecture of means is obtained, which considerably opens the fields of application of the ink jet printing technique such as it is at present used in the industrial field, these application fields being possibly extended to office automation for example.

The invention relates more precisely to a cell intended to be integrated in a hydraulic circuit, having a variable volume chamber, characterized in that this latter is:

- connected to a pressure sensor;
- controlled by a stepper motor;
- finally, connected to a plurality of valves each giving access to a restriction, the opening and closing of these values being controlled electronically as a function of the position of the rotor of said motor and accepting both directions of operation; such a combination of means making said cell capable of accomplishing multiple functions.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
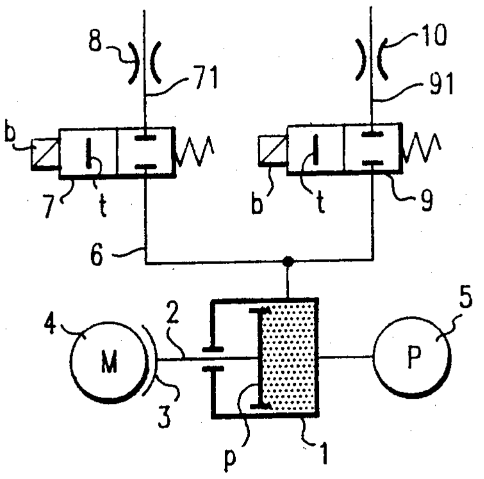
FIG. 1 illustrates schematically a cell of the invention controlled by stepper motor, equipped with a pressure sensor and "valve plus restriction" pairs.
Figure 2:
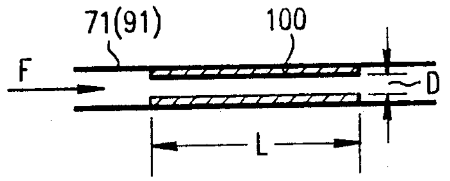
FIG. 2 illustrates schematically one embodiment of a local restriction of a hydraulic circuit intended to cooperate with a cell such as illustrated in FIG. 1.

A cell in accordance with the invention is illustrated in FIG. 1. It is formed essentially of a chamber 1 whose volume is variable as a function of the displacement of a piston p. This latter is connected mechanically by means 2 to an eccentric 3 driven by a stepper motor 4 whose operating mode will be explained further on. This variable volume 1 is connected on the one hand to a pressure sensor 5 and on the other through piping 6 to one, two or more valves electrically controlled by coils b. Only two valves 7 and 9 have been shown in FIG. 1, but this number is not restrictive and the application described further on will moreover clearly show the use of a plurality of valves associated with a single chamber. These valves accept both directions of flow of the fluid and are normally closed (in the case of FIG. 1) in the absence of an electric signal. The position of spool t shows for example that valve 7 is in the blocking position. Finally, in the outlet pipes 71, 91 from each valve a restriction 8, 10 is normally provided whose structure is clearly shown in FIG. 2. These restrictions are designed so as to create a pressure difference at their ends when a flow of fluid with non zero viscosity passes through them, which may result in a pressure drop. They are in particular capable of showing, through a difference of pressure ($\Delta P$) the viscosity of the fluid at the time of a fluid flow pulse. For this, as shown in FIG. 2, these restrictions are formed from a tube 100 integrated in series in the hydraulic circuit, of a length L appreciably greater than the diameter D of said tube. By way of example, the length L is equal to about 15 times the diameter D of the tube through which the fluid transits, the arrow F symbolizing the flow. This tube section of length L and diameter D corresponds then to the restriction such as symbolized in FIG. 1 by references 8 and 10 and by other references in subsequent Figures.

Figure 3A:
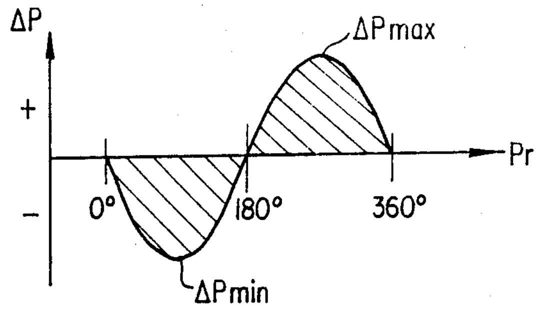
FIG. 3*a* illustrates schematically a pressure diagram of the cell in the operating configuration illustrated in FIG. 3*b;*

In FIG. 3*a* a pressure diagram is shown illustrating the variation $\Delta P$ as a function of the position Pr, for a complete revolution (from 0° to 360°) of the rotor of the stepper motor 4. This diagram corresponds to the configuration of cell 1 illustrated in FIG. 3*b* where the electrically controlled valve 7 is permanently open. The electrically controlled valve 9, always closed, is shown with dotted lines. By convention, in the rest of the description, the position 0° corresponds to the position Pr of the rotor of motor 4 where the volume of chamber 1 is minimum and 180° the position where the volume of chamber 1 is maximum. The displacement of piston P is illustrated by the arrows F1 and F2. This displacement causes a corresponding movement of the viscous fluid restriction 8 whose direction depends on that of piston p, whence its representation by arrow F3 and an arrow F4.

Displacement of piston p in the variable volume chamber 1 generates a displacement of fluid through valve 7 and restriction 8. The displacement of viscous fluid through restriction 8 causes, at the pressure sensor 5, the appearance of a pressure difference $\Delta P$ (FIG. 3*a*) which is positive or negative depending on the direction of displacement of the piston. The instantaneous value of this pressure depends both on the instantaneous flow rate of the fluid and on its viscosity. At the time of an increase in volume of the chamber (suction) $\Delta P$ is negative and at the time of a decrease in volume (delivery), $\Delta P$ is positive.

The diagram shown in FIG. 3*a* represents the evolution of the pressure measured at sensor 5 for a complete rotation from 0° to 360° of the motor 4, and this at a constant speed of rotation, the mechanical coupling between the rotor and the piston P being provided by an eccentric 3.

Figure 4A:
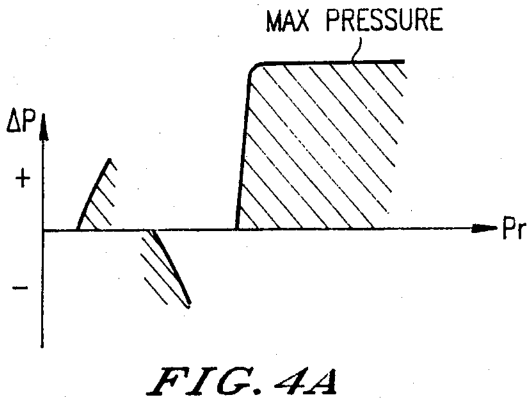
FIG. 4*a*, 4*b*, and 4*c* illustrate schematically pressure diagrams of a cell of the invention in its function leading to the determination of the positioning of the rotor of the motor.

Under these conditions where with a cell of the invention a sensor for detecting the position of the rotor is no longer required, which position Pr it is, however, essential to determine so as to be able to synchronize the operation of the valves. For that, the pressure diagrams will be used in the manner described hereafter. The fluid and the pressure sensor 5 are used for determining the angular 0° of the rotor of motor 4, namely Pr=0°. The nature of the fluid present in chamber 1 is determined first of all. The two valves 7 and 9 are closed. The rotor of the stepper motor 4 is moved a few steps in one direction, and a few steps in the other so as to determine the compression direction and the expansion direction. The rotor is then moved continually in the direction in which the pressure increases. This procedure is illustrated in FIG. 4*a* showing the evolution of the pressure difference $\Delta P$ as a function of the advance of the rotor step by step, in one direction first of all then in the other, and finally in the direction corresponding to compression.

If the pressure reaches the maximum measurable by the sensor 5, the fluid is an incompressible and viscous fluid, for example ink, and it is impossible in this way to determine the maximum compression point which corresponds to the angular position Pr=0° corresponding to the minimum value of chamber 1.

Figure 4B:
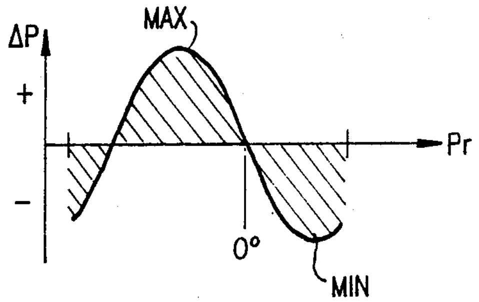

To get over that, one of the valves is open and the rotor makes a complete revolution (FIG. 4*b*). Then the differential pressure ΔP is measured, which is created by the restriction 8 or 10 corresponding to the open valve 7 or 9. The angular position Pr=0° is then determined by the medium position situated between the maximum (max) and the minimum (min) of ΔP, such as shown in FIG. 4*b*.

Figure 4C:
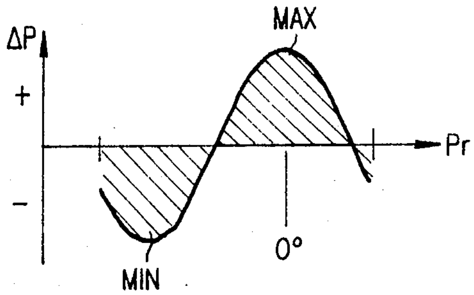

If, on the other hand, when the two valves 7 and 9 are closed the maximum pressure difference ΔP measurable by the sensor 5 is not reached, the fluid is compressible; it is then, in the example chosen, a mixture of air and ink. In this case, with valves 7 and 9 remaining closed, a complete revolution of the rotor is made and the angular position Pr=0° is determined by the maximum point of ΔP such as shown in FIG. 4*c*.

In accordance with the invention, by using such a process it is no longer necessary to use a specific sensor with the role of indicating the angular position of the rotor of the motor 4. Knowing this position, by this means, the synchronization of valves 7 and 9 may then be insured. This is one of the functions of a cell of the invention.

Figure 5:
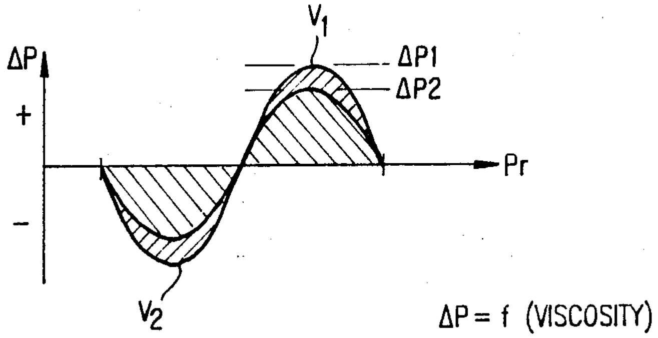
FIG. 5 illustrates schematically a variation of the pressure diagram of the cell for different viscosities of the fluids used.

In accordance with another characteristic of the invention, knowing the function ΔP=f viscosity the value of the viscosity of the fluid may be derived, for a known and fixed value of the restriction concerned and of the speed of rotation of motor 4, from the maximum values of the pressure differences (ΔP max and ΔP min) corresponding to the maximum instantaneous flow generated by the piston p. This other function of cell 1 is illustrated in FIG. 5 which shows the two diagrams ΔP=f (Pr) for two different viscosities V1 and V2 of the fluid.

The functions of measuring the position Pr of the rotor of motor 4 and that of measuring the viscosity of the fluid having been described, the operation of the cell will now be described, in accordance with another characteristic of the invention, in its function for generating a fluid flow, the cell then behaving as a veritable pumping cell.

Figure 3B:
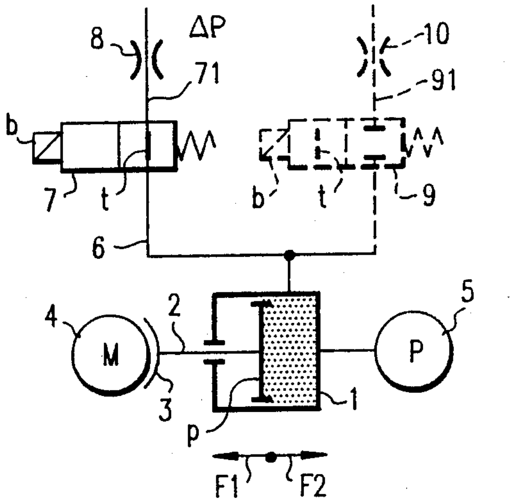
Figure 6A:
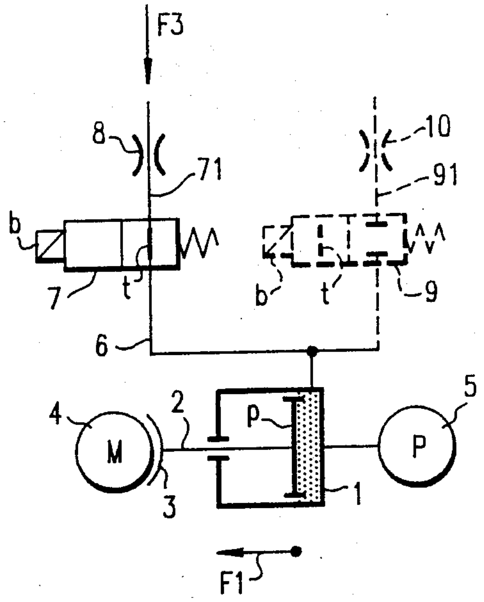
FIG. 6*a* and 6*b* show schematically the state of the values, respectively open and closed, corresponding to the suction and delivery cycles.
Figure 6B:
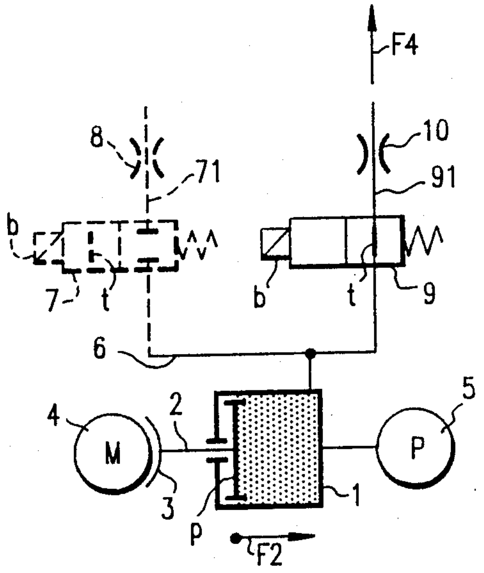
Figure 7:
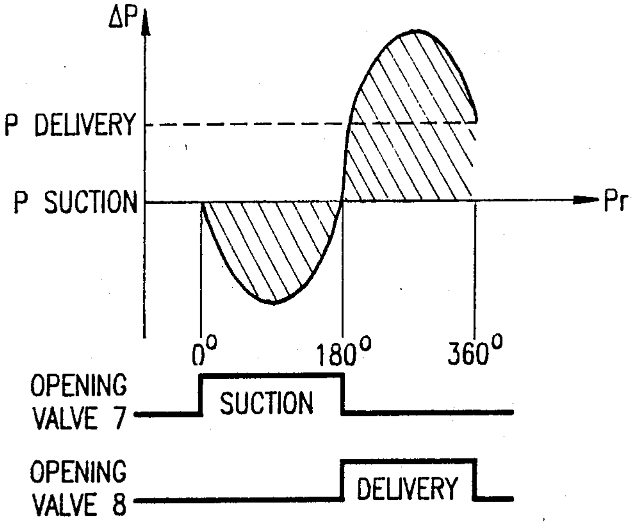
FIG. 7 illustrates schematically these suction and delivery cycles.

The generation of a fluid flow takes place in two half cycles. The first one (FIG. 6*a*) consists in causing valve 7 to open during the half revolution of the motor from the position Pr=0° to the position Pr=180° that is to say the time during which the volume of chamber 1 increases (arrow F1); the fluid is sucked (arrow F3). The second half cycle (FIG. 6*b*) consists in causing valve 9 to open during the following half revolution of the motor from Pr=180° to the Pr=360° that is to say the time during which the volume of the chamber decreases; the fluid is delivered (arrow F2). FIG. 7 shows the pressure difference ΔP measured by the sensor 5 during the two half cycles explained above and which corresponds to a suction phase following opening of valve 7 and a delivery phase corresponding to opening of valve 9. Under these conditions, a fluid flow may be generated in both directions by reversing the operation of valves 7 and 9 or else may not be, if one of the two valves is kept open and the other closed while the motor rotates, as is illustrated in FIG. 3*b*. These two particular operating modes, characteristic of the invention, are essential for the application described herebelow. In addition, it is possible to add other valve-restriction pairs to the same variable volume chamber, so as to create a multi-input/multi-output pumping system, such as will be explained in the embodiment of the supply circuit of the invention described hereafter.

Among the other functions which the cell of the invention may provide, we may mention emptying of a pressurized reservoir for the, benefit more particularly of another reservoir. For that it is sufficient to open simultaneously the two valves associated respectively with these two reservoirs.

Furthermore, the configuration of a circuit comprising a cell of the invention makes possible the direct measurement of a pressure by means of sensor 5 by placing chamber 1 in direct relation with the member whose pressure it is desired to measure. The valve which controls this member situated downstream is then kept in the open position, the motor is stopped and the pressure sensor 5 is then directly in communication, through chamber 1, with said member, not shown here, but an example of which will be given subsequently.

Figure 8:
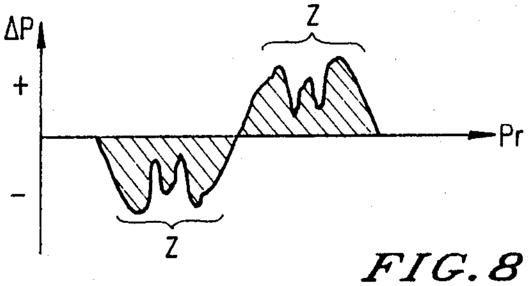
FIG. 8 illustrates schematically the pressure diagram in the case where the fluid is not homogeneous.

If the transported fluid includes several phases, the pressure diagram is not as is shown in FIG. 7 but as is illustrated in FIG. 8. Clearly visible zones of disturbances Z appear in the diagram ΔP=f(Pr) and are the image of the viscosity variation of a two phase fluid (for example: ink plus air). This is an additional function which a cell of the invention may accomplish, namely the detection of homogeneity defects of the transported fluid. Thus the presence of air bubbles may for example be detected in the conveyed ink. The profile shown in FIG. 8 is only one example, knowing that any profile of the diagram departing from a sinusoid, whereas all the other parameters are correct, reveals a multiphase fluid.

The operation of a cell in accordance with the invention, it should be noted, differs from the conventional operation of a membrane pump with non return valves. In fact, the valves are here replaced, in accordance with the invention, by the bidirectional valves 7 and 9 controlled in synchronism with the absolute position of the rotor of the stepper motor 4 by an appropriate electronic system. Such an arrangement leads to obtaining all the functions which the cell thus described may accomplish.

Having now described the basic multi-function cell of the invention, in its main operating modes, an application of such cells will now be described adapted so that in combination with ink and solvent reservoirs they form an original hydraulic supply circuit capable on the one hand of supplying a continuous ink jet printing head with ink and, on the other, of recovering the ink not used for printing, which ink is collected in a recovery gutter.

Figure 10A:
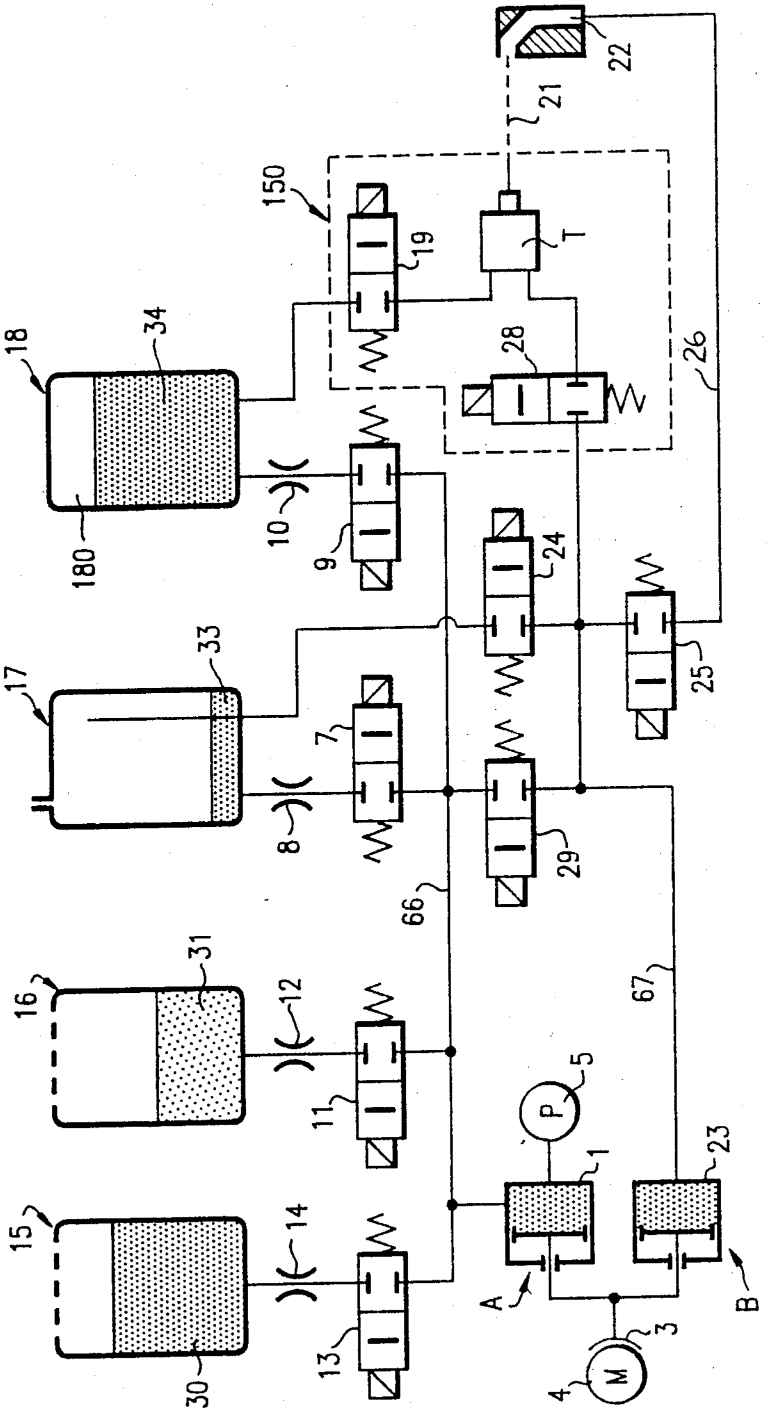
FIG. 10*a* illustrates schematically a first embodiment of an ink supply circuit for a printing head using two cells in accordance with the invention in a static position, that is to say stopped.

Such a circuit in accordance with the invention is illustrated in FIG. 10*a* in a static configuration, all the valves being in the closed position. This circuit includes four reservoirs two of which are removable. Reservoir 15 is a cartridge containing the reserve ink 30, not yet used. This reservoir 15 is removable. Reservoir 16 is a cartridge containing the pure solvent 31 of the ink used. This reserve solvent 31 makes it possible to top up the solvent required so as to maintain the viscosity of the ink used and recycled in the system. Maintenance of the viscosity of the ink of the jet is related to evaporation of the solvent during recycling of the ink. This reservoir 16 is also removable.

The reservoir 18 containing ink 34 functionally fulfills the role of a pressure accumulator which is used for the purpose of transforming the pulsed flow of the cell when it is used as a pumping cell into a constant fixed pressure flow, intended directly for forming the jet. This reservoir therefore contains a pressurized air pocket 180 which plays the role of damper. This air pocket 180 is renewed whenever the printer is started up, as will be explained further on.

The purpose of reservoir 17 is to receive the recovered ink 33 and air returning from the gutter 22 and to separate them. The ink required for maintaining the pressure in the accumulator 18 is taken from this reservoir. Reservoir 17 has a volume equivalent to accumulator 18, for reasons explained further on.

Each of these four reservoirs 15, 16, 17, 18 is connected, in accordance with the invention, by a general duct 66 to a first variable volume chamber 1 through a valve-restriction pair 9–10 for reservoir 18; 7–8 for reservoir 17; 11–12 for reservoir 16; and 13–14 for reservoir 15. All these restrictions, as has already been mentioned, are of the type shown in FIG. 2. The assembly of these cells, the heart of which is chamber 1, bears the general reference A.

The pressure sensor 5 is connected to this first chamber 1 and makes possible a whole series of controls and measurements corresponding to the functions described above and which are explained hereafter in the application considered. One of the characteristics of this supply circuit is that it only has a single sensor, the pressure sensor 5, and this single sensor 5 makes possible all the measurements required for the correct operation of the assembly, namely measurement of the pressure of the ink feeding the jet, measurement of the viscosity of the ink, control of the level of the reservoir 18 during regeneration of the air pocket, measurement of the empty level of reservoir 17, measurement of the low level and of the empty level of the solvent reservoir 16, measurement of the viscosity of the ink of the reservoir 15, which parameter is related more particularly to the temperature, measurement of the low level and of the empty level of the ink reservoir 15, synchronization of the operation of the valves with the position Pr of the rotor of motor 4. As can be seen, and as it should again be emphasized, this single pressure sensor 5 alone replaces all the sensors which are necessarily required in supply circuits of presently known types.

A variable volume chamber 23 also cooperates with a plurality of valves; this combination is referenced B. Its essential purpose is to recover the ink of the jet 21 at gutter 22. This second chamber 23 is in fact combined with a set of three valves 29, 24, 25 whose functions will be explained further on. This second cell does not comprise any restrictions to the extent that, since it is coupled mechanically to the eccentric 3 common to the first chamber 1, synchronism of the operation of the valves which are associated therewith follows from the synchronism of chamber 1. Such a combination of two assemblies A and B in accordance with the invention, coupled then to a single motor 4 and to a single sensor 5, further contributes to the compactness of the circuit. At A is shown the cell corresponding to the assembly including chamber 1, more especially related to the supply of head T, and B the cell corresponding to the assembly including chamber 23 which controls recovery of the ink from the gutter 22. This latter is connected to valve 25 through the duct 22, valve 25 being itself connected to the general piping 67 of assembly B. Valve 29 serves for coupling between the two ducts 66 and 67 whereas valve 24 is connected both to reservoir 17 and to duct 67.

The functions of the valves 19 and 28 are related directly to the operation of jet 21 emitted by the printing head T and form part of the known art, particularly from the patent application of the applicant already mentioned above.

For that, this combination is fictitiously isolated from the rest of the circuit by means of a broken line rectangle 150. It should be noted that valve 19 is respectively connected to the pressurized reservoir 18 and to head T which generates the ink jet 21. Valve 28, called drain valve, is connected to valves 24, 25, 29 of cell B. The unused ink jet is recovered from a recovery gutter 22.

The operation of the supply circuit of the invention is now described for the main phases during which the cells of the invention accomplish their multiple functions already described above.

Figure 9:
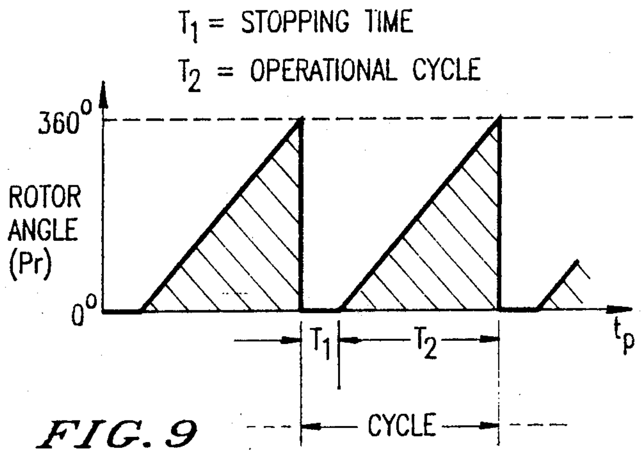
FIG. 9 is a diagram illustrating the position of the rotor of the motor actuating the variable volume chamber, as a function of time, in an application to the ink jet.

It should be noted previously that, in all cases, except when it is referred to motor 4 rotates cyclically at a constant speed, which means that the variable volume chambers 1 and 23 which are coupled together each generate their volume cyclically. This rotational cycle T1 Plus T2 presents, at each revolution, a stop for a time T1 required for measuring a static pressure, a pressure measurement not influenced by the differential pressures induced by flows in the restrictions 8, 10, 12 and 14. This time allowed makes it possible to measure the static pressures of the ink of cartridge 30, of the solvent of cartridge 31 and of the pressurized ink 34 in reservoir 18. The usefulness of these measurements will be explained further on. The corresponding diagram illustrating the evolution of position Pr of the rotor as a function of time tp is shown in FIG. 9.

The essential operating cycles are then effected by electrically controlling the different valves synchronously at the instantaneous position Pr of the rotor of motor 4, as was explained above.

For ease of understanding, a succession of FIGS. 10*b* to 10*i* has been shown each corresponding to the situation in which the different valves concerned find themselves for a given operating phase. Those which are open (passage of the fluid) for the sequence considered are shown with continuous lines, the others being closed (blocking of the fluid) are shown with dotted lines. When the valve considered is held permanently open (passing), the whole of coil b is shaded and the spool t shown with a continuous line. When the valve is successively opened and closed at each half cycle, coil b is half shaded and spool t is shown with dark dotted lines. All the valves not concerned in the operating phase described are therefore shown with light dots.

During operation of the printer, valve 19 is open, head T is supplied and jet 21 emitted. Such a representation makes it possible to see at a glance the path followed by the fluid between the different elements of the circuit and particularly the transfer of ink and solvent from one reservoir to another, the supply of head 10 and the recovery of the unused ink from gutter 22 to reservoir 17.

Each of these principle functions will now be described in greater detail in connection with FIGS. 10*b* to 10*i:*

(a) Maintenance of the pressure of the accumulator 18 during operation of the jet (FIG. 10*b*):

When valve 19 is open and jet 21 is present, the volume of ink 34 in accumulator 18, which is subjected to the pressure of the air pocket 180 which it contains, decreases in time, during flow of jet 21, which increases the air volume 180 and results in a pressure drop. Maintenance of the pressure, and so of the volume of ink contained (34) is provided by adding a dose of ink to reservoir 18 coming from reservoir 17, and this through the combination 1, 7, 9 which is caused to operate as a pumping cell, as was explained above particularly with reference to FIG. 6*a* and 6*b*. When reference is made to a dose in the description, it refers to the volume corresponding to that which is generated by piston P in chamber 1 with, for this sequence, the help of valves 7 and 9.

In order to be able to maintain the pressure in reservoir 18, it is necessary to monitor it. This is done periodically during the stopping time T1 of the rotor of the motor, by means of sensor 5. Obviously, this period of measurement is less than that for regenerating ink in reservoir 18. In other words, the successive measurements of the static pressure of reservoir 18 are made at a frequency greater than that of the ink doses which are required for maintaining the pressure in reservoir 18 (flow of the jet).

(b) Measurement of the viscosity of the ink feeding the jet and adjustment of this viscosity as a function of a given reference (FIGS. 10*c*, 10*d* and 10*e*):

Keeping the operating parameters constant in time is of prime importance for ensuring high printing quality. The viscosity of the ink must then be regularly monitored so as to be corrected by adding solvent if it is higher than a reference whose value is determined in a way described further on.

Figure 10B:
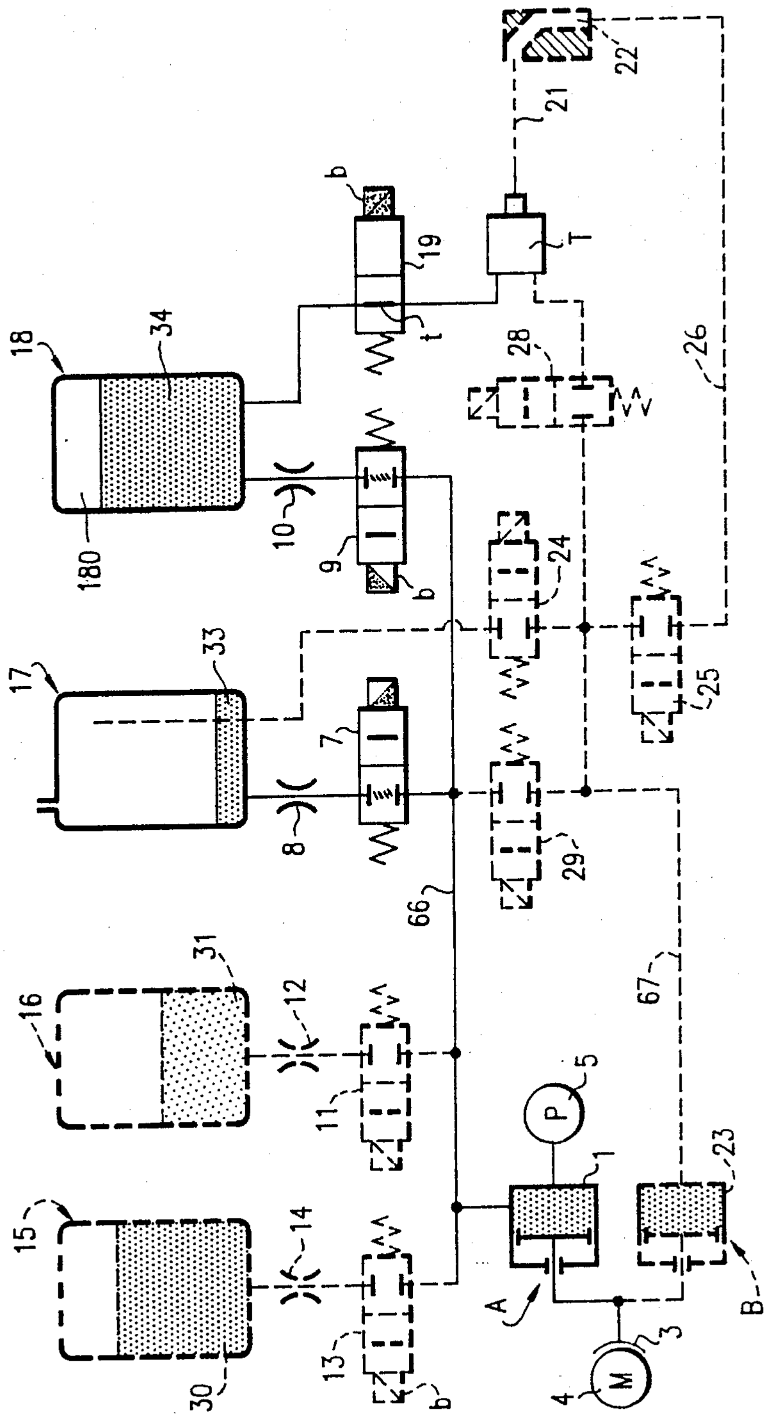
FIGS. 10*b* to 10*i* each illustrate schematically the position occupied by the different elements of the circuit such as described with reference to FIG. 10*a*, respectively for each of the main functions inherent in the correct operation of said circuit.
Figure 10C:
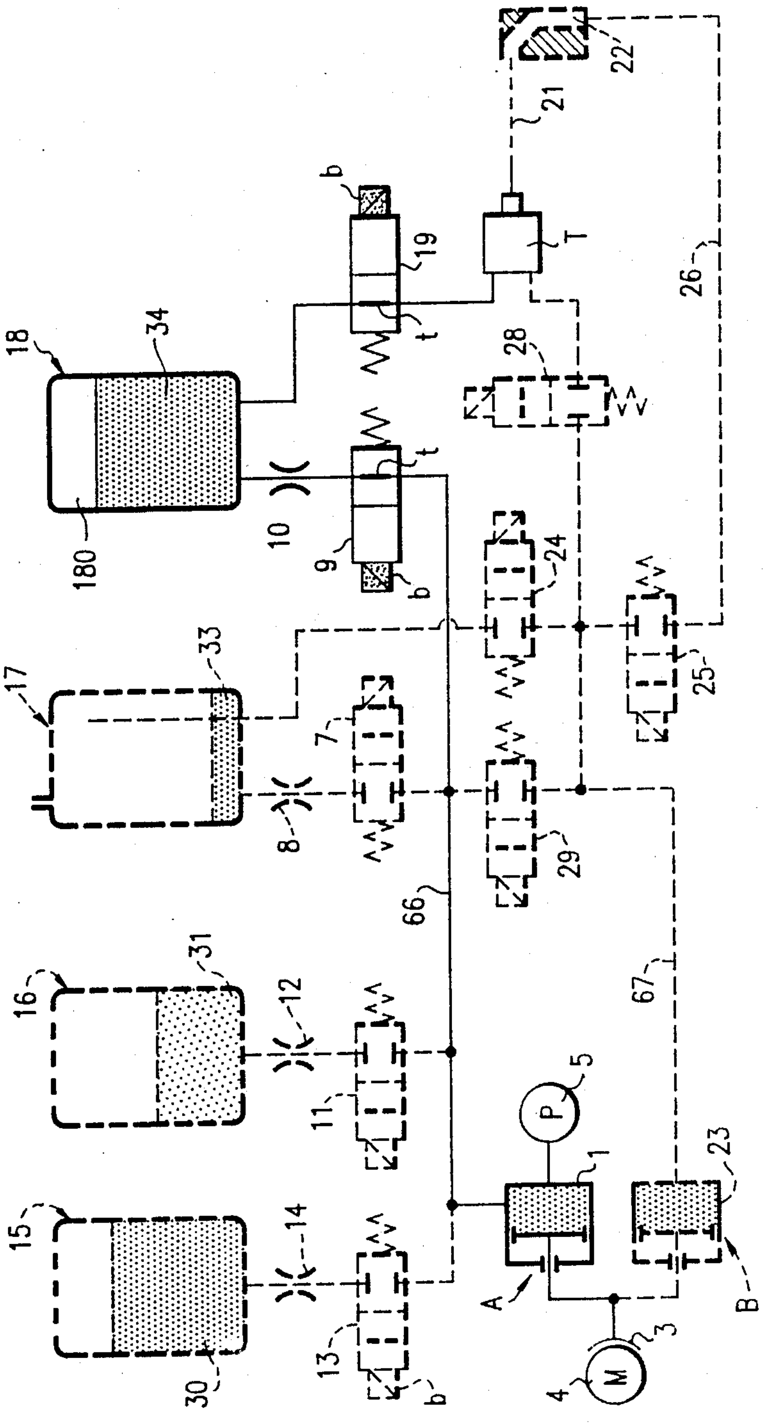

The viscosity of the ink is checked regularly using a complete cycle of rotation of the rotor while leaving valve 9 open, as shown in FIG. 10*c*. The differential pressure $\Delta P$ makes possible the measurement of the viscosity of the ink 34. This viscosity measurement cycle takes place when no addition of ink is required in reservoir 18.

This cycle makes it possible also to homogenize the ink in reservoir 18 when it has just received a dose of solvent, by alternately stirring the ink. Thus, when solvent has just been added to reservoir 18, as will be explained further on, the cycle is repeated several times before serving for measuring the viscosity.

Figure 10D:
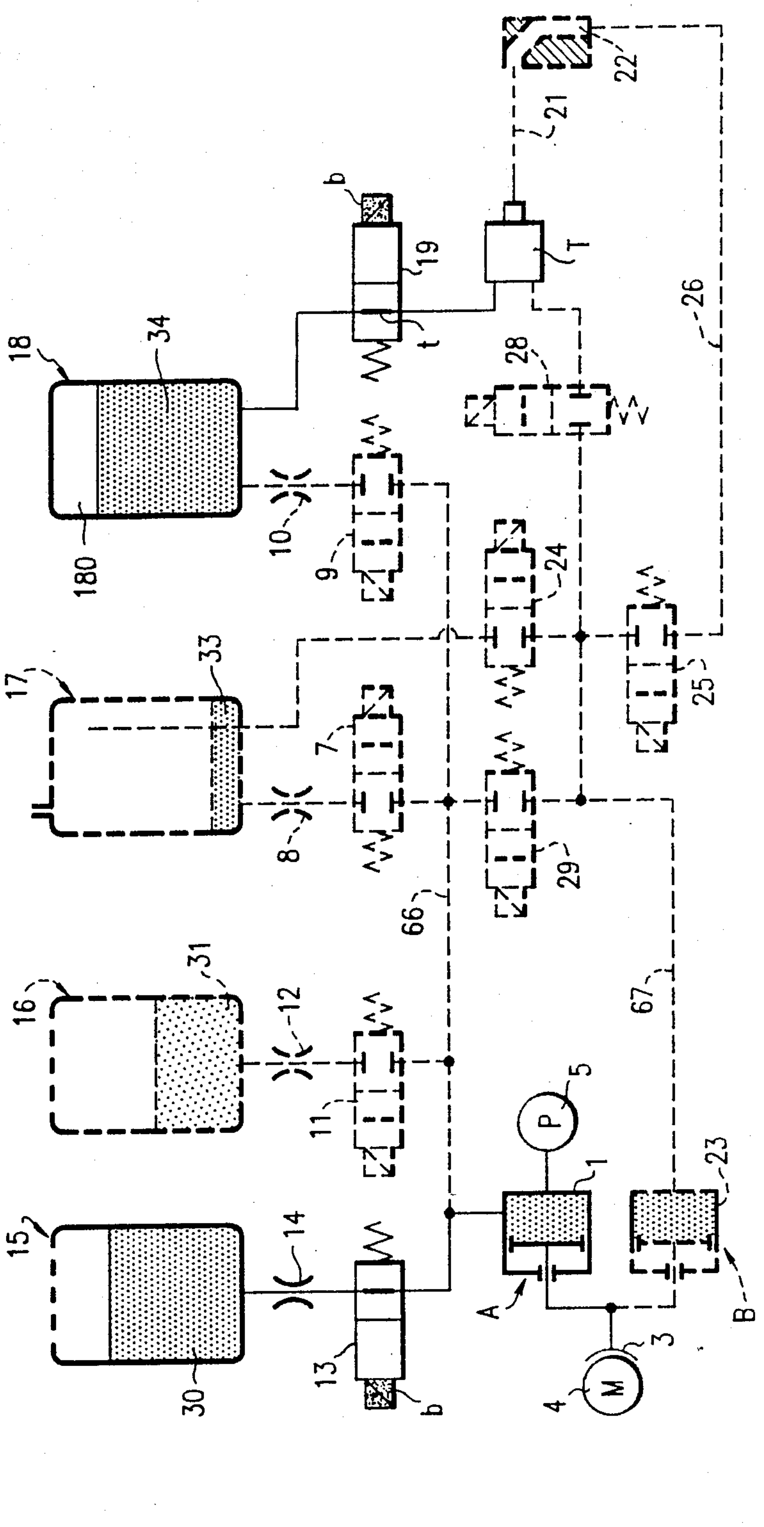

The viscosity of the ink used, apart from any evaporation of solvent, depends on the temperature. Therefore the viscosity reference must take into account the variation of viscosity of the ink as a function of the temperature. For this, the viscosity reference of the ink used is fixed by measuring the viscosity of the new ink in cartridge 15. This measurement is achieved by measuring the differential pressure $\Delta P$ during a cycle of the rotor when valve 13 remains permanently open (FIG. 10*d*). Thus are overcome the constraints associated with the use of different types of ink which have not the same properties as a function of the temperature.

Figure 10E:
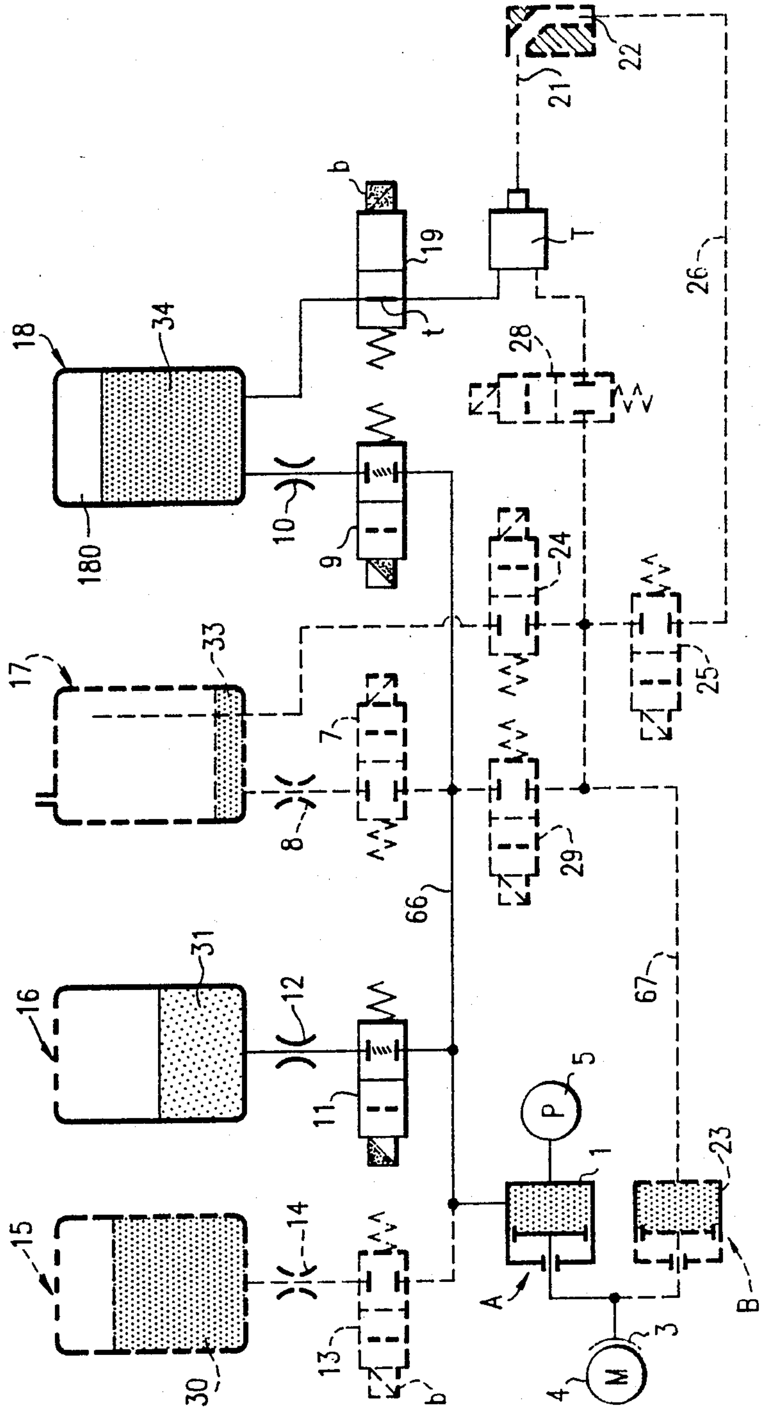
Figure 10F:
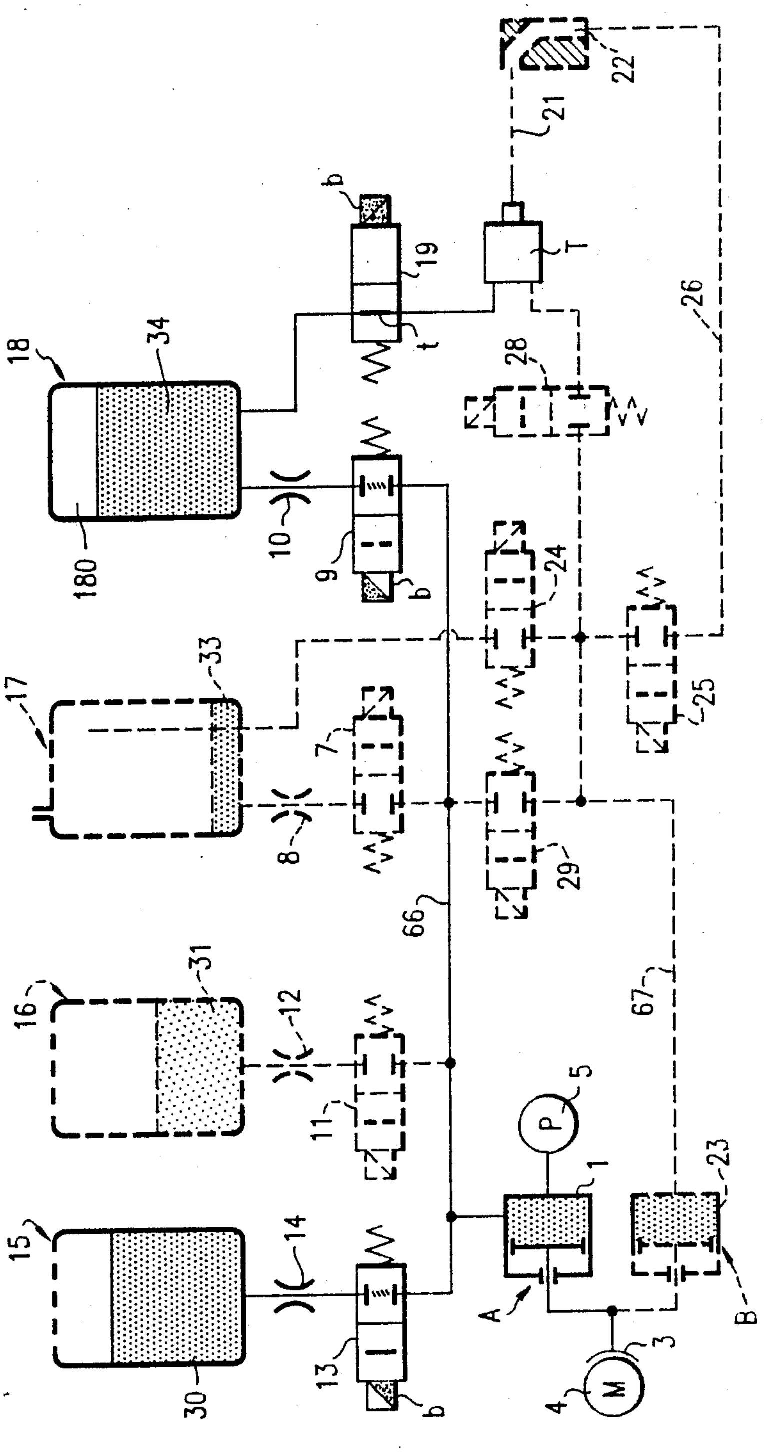
Figure 10G:
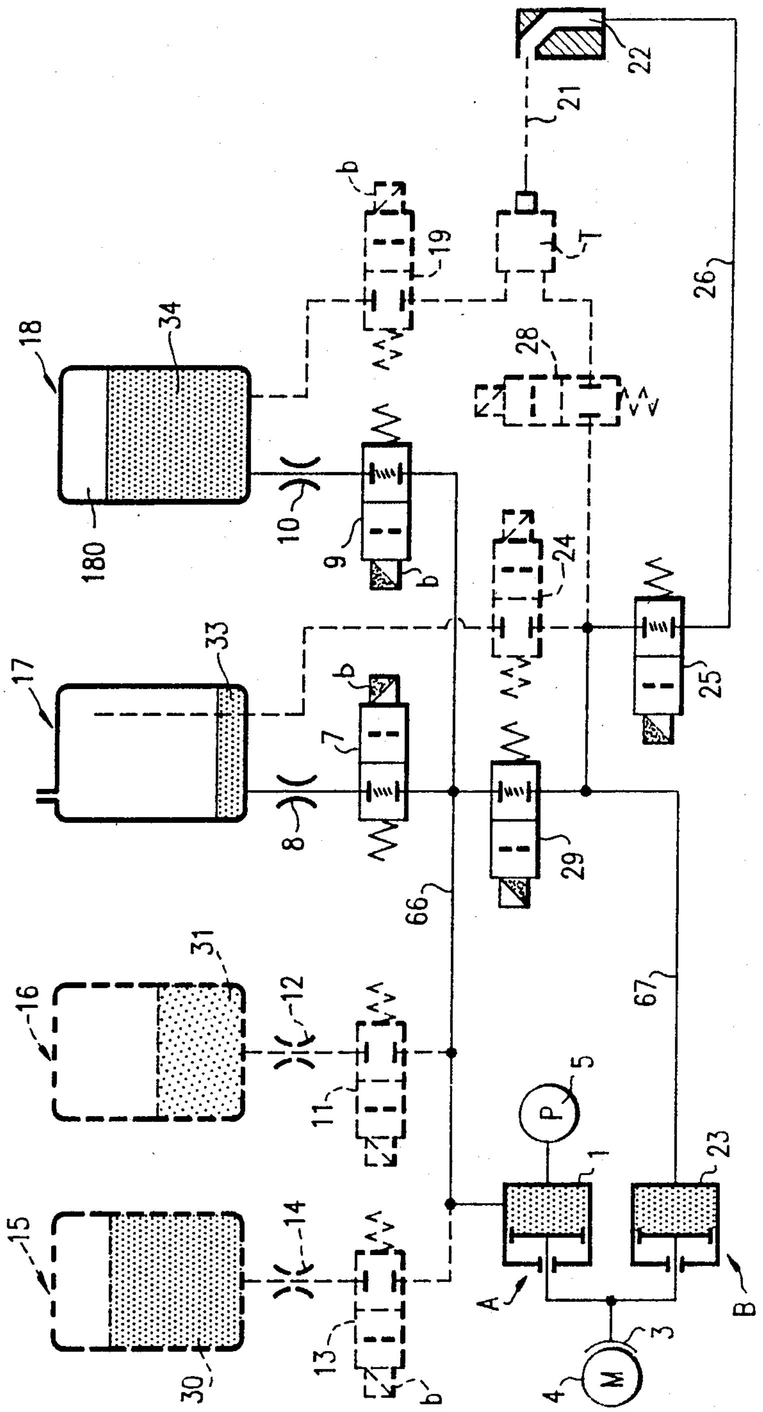
Figure 10H:
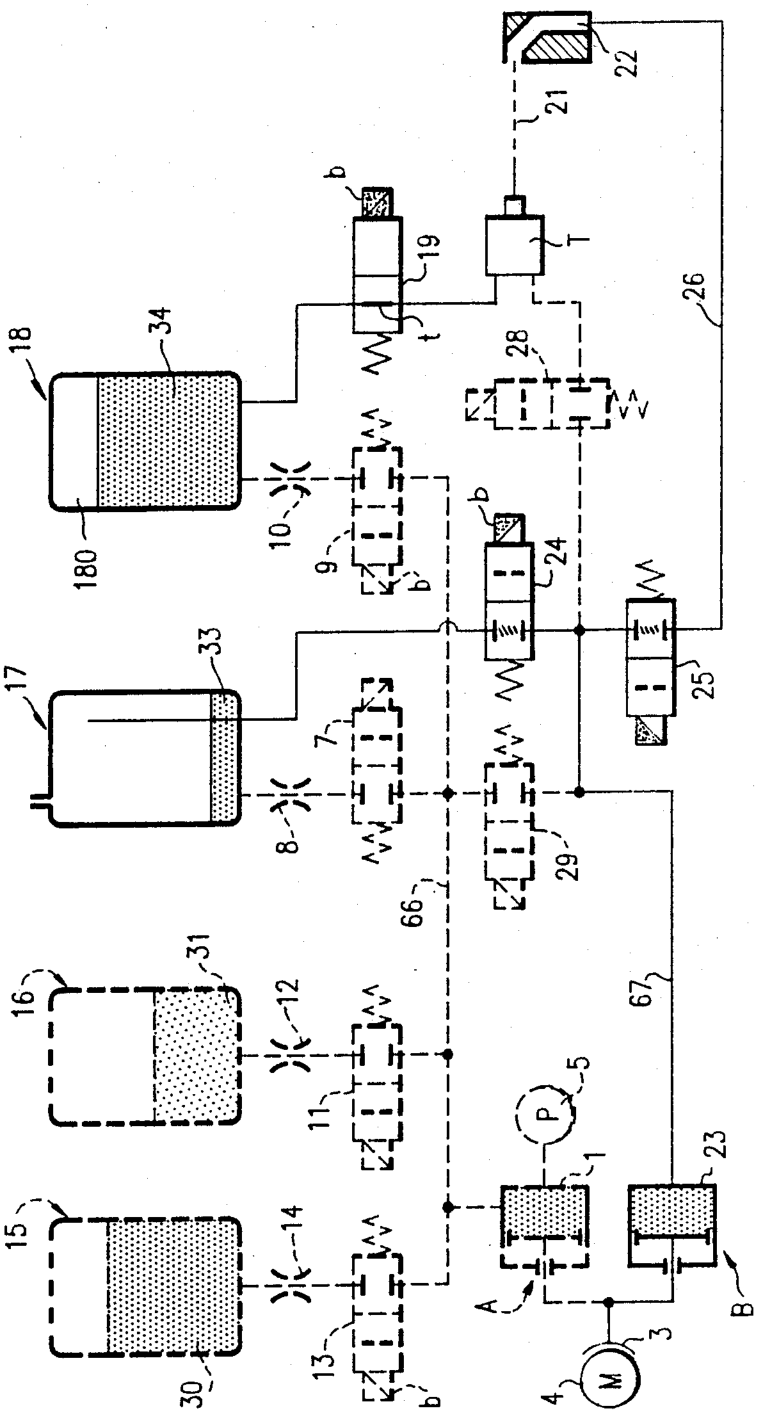
Figure 10I:
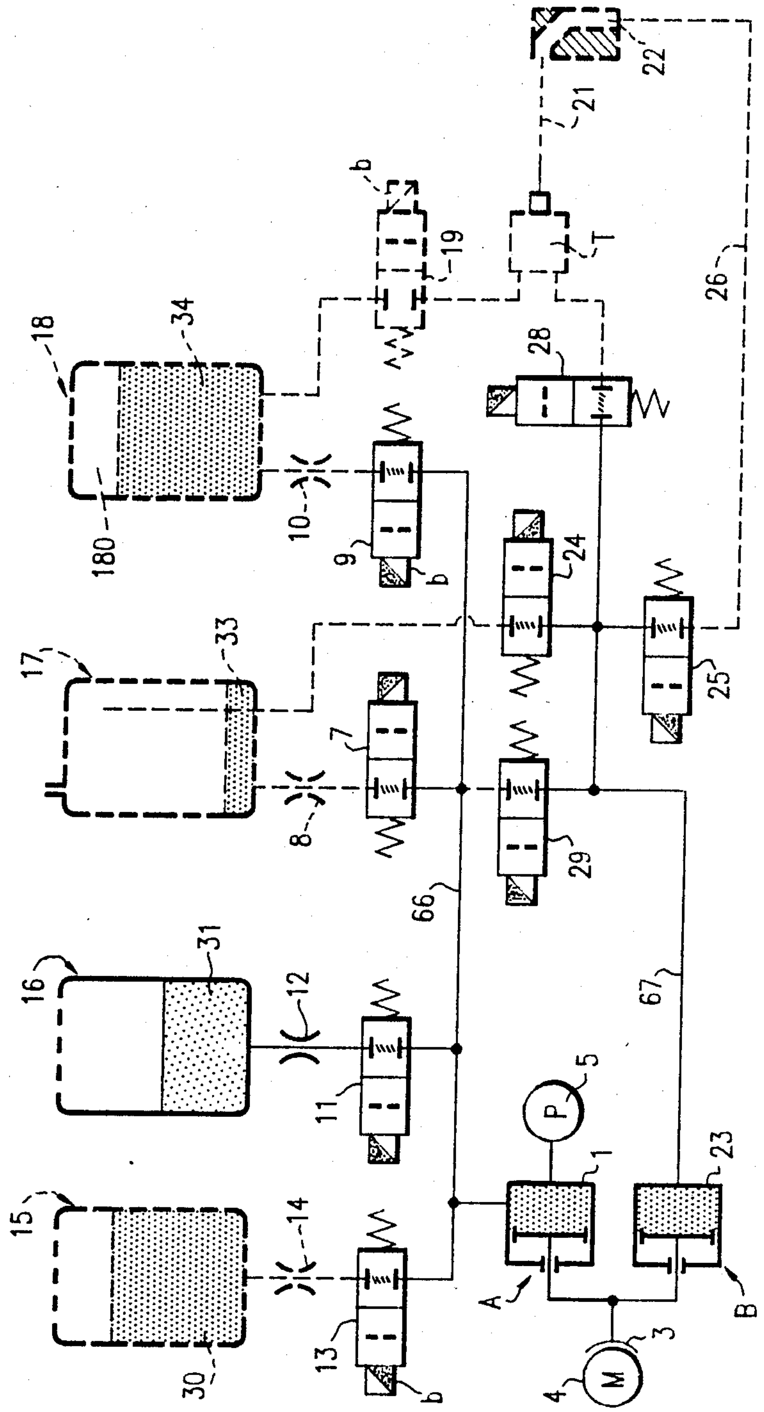

When the viscosity of the ink contained in reservoir 18 is considered too high, a dose of solvent 31 from cartridge 16 is fed into reservoir 18. For this, as shown in FIG. 10*e*, the two valves 11 and 9 are open and cell A by means of 1, 11, 9 operates as a pumping cell, as shown in FIG. 10*e*.

(c) Measurement of the level in reservoir 17 and addition of ink to reservoir 18 (FIG. 10*f*):

When addition of ink is required in the reservoir-accumulator 18, the ink is drawn from reservoir 17. The two valves 7 and 9 are open and operate with chamber 1 as a pumping cell (FIG. 10*b*). If, during this addition, an intake of air is detected (reservoir 17 empty) in the form of a defect of the differential pressure diagram appearing at the terminals of restriction 8, such as was explained above and illustrated in FIG. 8 during the suction half cycle, then the delivery half cycle is carried out by keeping valve 7 open instead of opening valve 9 so as to push the air back into reservoir 17. In the next cycle, with no addition of ink made and the pressure in reservoir 18 continuing to remain too low, a new addition of ink is carried out, but this time from the ink cartridge 15, using consecutively valves 13 and 9 operating with chamber 1 as a pumping cell, as is shown schematically in FIG. 10*f*.

(d) Measurement of the low and empty levels of cartridges 15 and 16:

The removable ink and solvent cartridges 15 and 16 are each formed of a flexible envelope containing the liquid 30 and 31, this flexible envelope being protected by a rigid case.

The flexible envelope containing the liquid (ink or solvent) has the characteristic, because of its form, of being all the less deformable the lower the remaining volume of liquid. This results in the appearance of a depression of liquid in the pockets all the higher, the smaller the volume of liquid remaining.

During a cycle for taking ink 30 or solvent 31, the static pressure in the pocket concerned is measured by keeping the corresponding valve 13 or 11 open during the time T1 during which the rotor is stopped (FIG. 9). The liquid level 30, 31 in the deformable pockets is considered low when the depression measured is less than a given reference.

An attempt at taking liquid from cartridges 15 and 16, when the corresponding pockets are empty, results in an absence of flow through restrictions 14 and 12. This absence of flow appears on the pressure diagram obtained by a zero differential pressure (flat diagram) which indicates the empty level of the cartridges. An important remark to be made is that, in the case of an empty cartridge, a zero differential pressure due to an nonexistent flow is associated with a static pressure under high depression with respect to the surrounding pressure whereas, in the absence of a cartridge, a zero differential pressure is associated with a static pressure equal to the surrounding pressure.

(e) Maintaining the air pocket at the pressure required for operation of the accumulator 10 (FIG. 10*g*):

So that the reservoir-pressure accumulator 18 can play its role correctly, it is necessary to guarantee a minimum volume of air therein. The free air contained in the reservoir is always subject to slow but certain dissolution in the ink 34 and it is therefore necessary, so as to maintain the efficiency of the pressure accumulator function of reservoir 18, to regularly restore this volume of air. This is made possible by emptying the reservoir of ink, by allowing the outside air to enter into the reservoir if this is under depression (a result of a "lack of air" by dissolution in the ink during operation) and by filling it with ink again up to the operating pressure of the jet, these series of operations being carried out before each start up of the jet.

This is done in the following manner. With reservoir 18 under pressure, it is in a first step emptied of its ink by opening both valves 7 and 9 simultaneously, with motor 4 stopped, the pressurized air driving ink 34 into reservoir 17 faster than would a cell operating as a pumping cell whose flow rate is of the same order as that of the jet. The pressure recorded during this emptying is the medium pressure between the pressure in reservoir 18 and the surrounding pressure. As soon as this pressure measured by sensor 5 is practically equal to the surrounding pressure, the motor is again used for creating a pumping function, valve 9 being open during the suction half cycle and valve 7 being open during the delivery half cycle.

This reversed operation is carried out until there is no liquid flow through the restriction 10, which means that reservoir 18 is completely empty. The volume of ink sucked in by the pumping cell has placed reservoir 18 under depression. The ink 34 initially present in reservoir 18 is then contained entirely in reservoir 17.

Valves 9, 29 and 25 are then open so as to allow the outside air coming from gutter 22 to regenerate the volume of air in reservoir 18.

The last operation consists in taking up again the ink contained in reservoir 17 and placing it again under the pressure of the volume of regenerated air in reservoir 18, by causing the pumping cell to operate, valve 7 being open during the suction half cycle and valve 9 being open during the delivery half cycle.

During the low pressure emptying and filling phases of reservoir 18, in order to increase the flow rate, chamber 23 is preferably coupled to chamber 1 through valve 29 which is kept permanently open and which serves in this case for coupling between the two chambers.

(f) Suction of the jet by gutter 22 (FIG. 10*h*):

Suction of the ink jet by gutter 22 is possible by using the cell including valves 25, 24 associated with chamber 23 operating as a pumping cell, chamber 23 being coupled, as was mentioned above, to motor 4. The air-ink mixture recovered from gutter 22 through duct 26 is fed back to reservoir 17.

(g) Automatic short stop procedure (FIG. 10*i*):

One of the problems raised by printers using inks with volatile solvents is the drying of the ink whose dry resins often foul up the elements having relatively moving mechanical parts. The valves in particular are the first involved. An ink circuit of the invention overcomes this problem for it makes it possible to fill all the valves with solvent before stopping of the machine and so, even if the solvent dries, these valves will not be stuck for the solvent has no sticky resins. Such cleaning by using solvent is achieved very simply in as many motor cycles as there are valves to be filled, by taking for each of them during the suction half cycle with valve 11 open, a dose of solvent from cartridge 31 and injecting it into the valve concerned, which is then opened.

This is done for valves 13, 7 and 9 as well as for valves 24 and 25, these latter valves being filled while simultaneously opening valve 29.

(h) Automatic procedure for complete cleaning, long stop or ink change:

The first phase consists in transferring the ink completely from reservoir 17 to reservoir 18 by operating the cell 7, 1 and 9. The second phase consists in letting the ink contained under pressure in reservoir 18 to escape gutter 22 by opening valves 9, 29 and 25 and pumping the remaining ink, if any, through cell 9, 29, 25 by means of the two coupled chambers 1 and 23. The third phase consists in transferring the solvent contained in cartridge 31 into reservoir 17 then into reservoir 18. This pressurized solvent is then expelled into gutter 22 after having rinsed the nozzle body of head T (valves 19, 28, 25). All these operations provide completely automatic rinsing of the assembly of the supply circuit. It is sufficient to correctly control the different valves and to cause the cell groups A and B to operate as pumps.

Figure 10J:
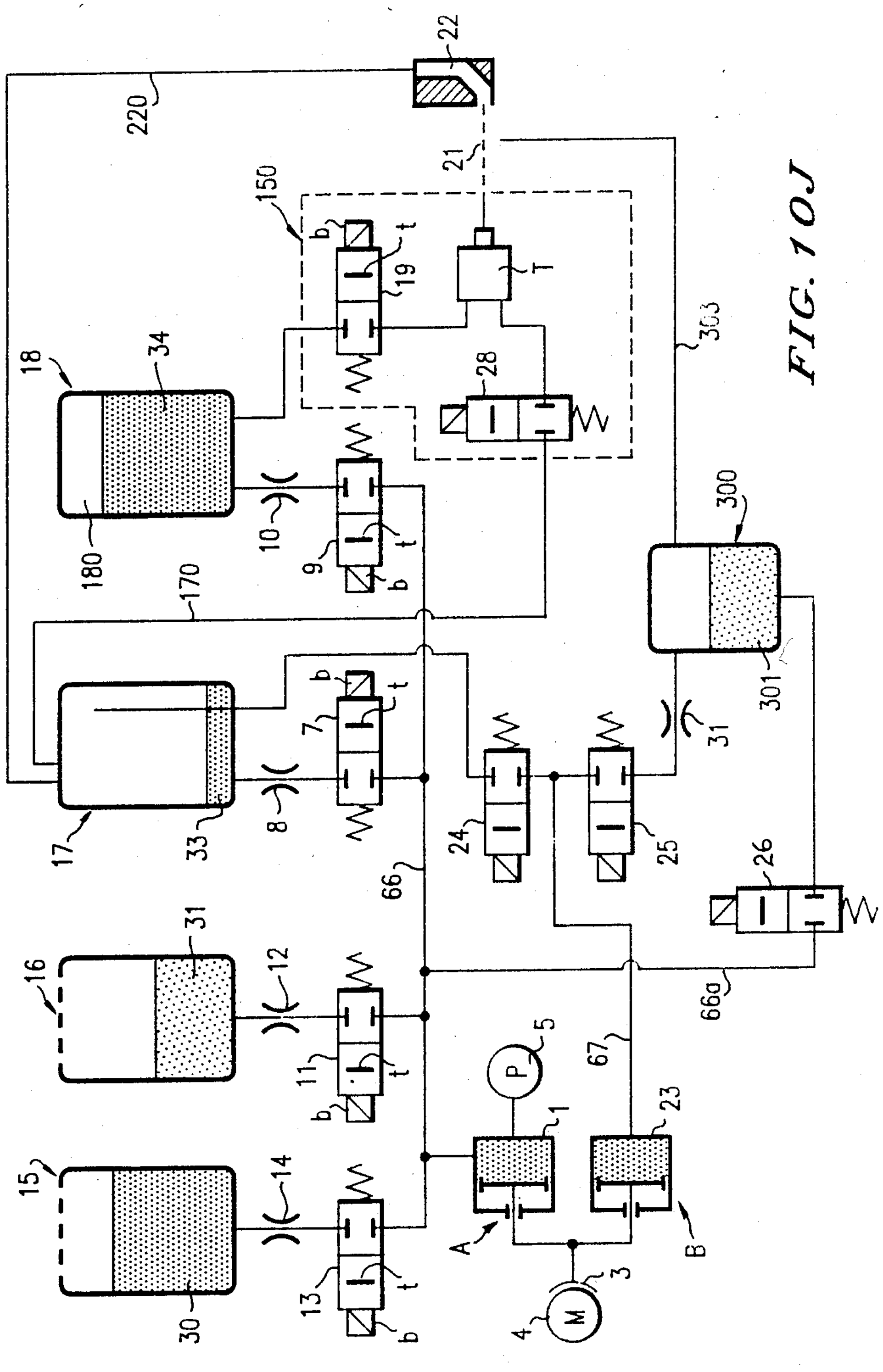
FIG. 10*j* illustrates schematically another embodiment of an ink supply circuit for a printing head in accordance with the present invention, in the static position.
Figure 10K:
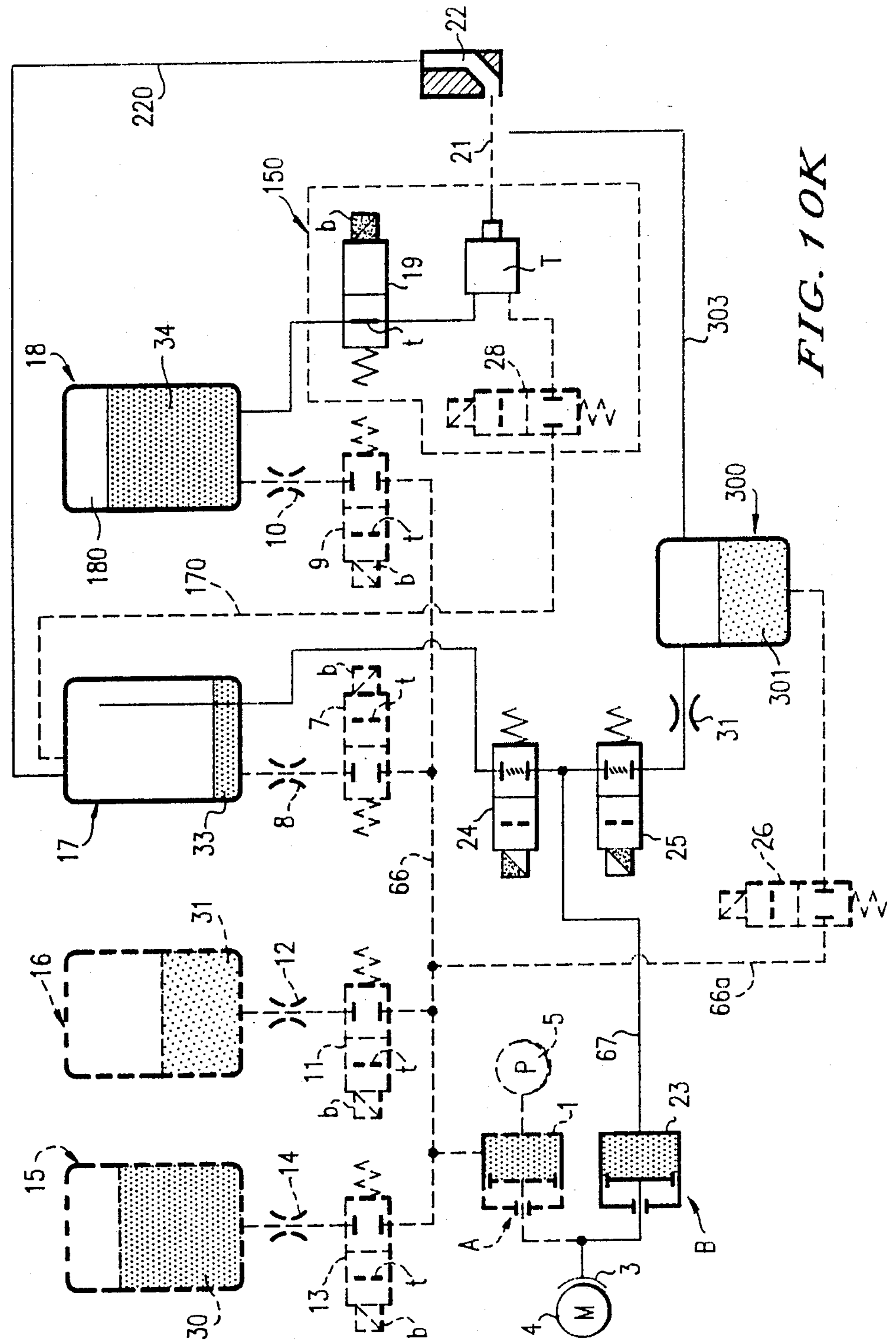
FIGS. 10*k* and 10*m* illustrate each of the positions occupied by the different elements of the circuit such as described with reference to FIG. 10*j*.
Figure 10M:
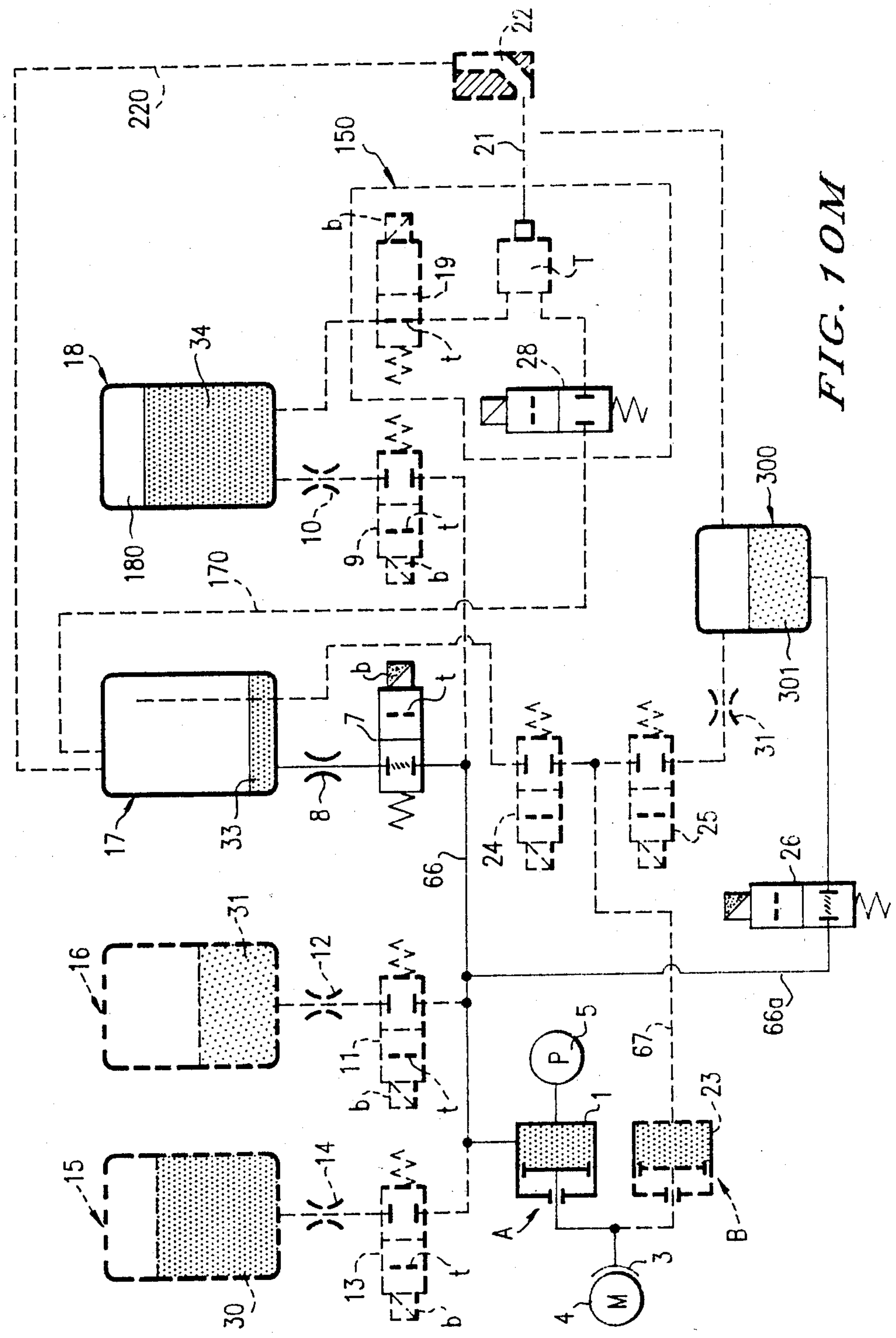

Another embodiment of the supply circuit of the invention is illustrated in FIGS. 10*j*, 10*k* and 10*m*. As can be seen in FIG. 10*j*, which is a static representation of the circuit, this latter includes four reservoirs of which two are removable. Reservoir 15 is a cartridge containing the reservoir ink 30, not yet used. Reservoir 15 is removable, reservoir 16 is a cartridge containing the pure solvent 31 for the ink used. This reserve solvent 31 makes it possible to top up the solvent required for maintaining the viscosity of the ink used and recycled in the system. Maintenance of the viscosity of the ink of the jet is related to evaporation of the solvent during recycling of the ink. This reservoir 16 is also removable.

Reservoir 18 containing the ink 34 functionally fulfills the of a pressure accumulator which is used for transforming the pulsed flow of the cell, when it is used as a pumping cell, into a constant flow at a fixed pressure and intended directly for forming the jet. This reservoir, for this purpose, contains a pressurized air pocket 180 which plays the role of damper. This air pocket 180 is renewed at each start of the printer.

The purpose of reservoir 17 is to receive the ink recovered 33 and air returning from gutter 22 and separating them. The ink required for maintaining the pressure in the accumulator 18 is taken from this reservoir.

Each of these four reservoirs 15, 16, 17, 18 is connected, in accordance with the invention, by a general duct 66 to a first variable volume chamber 1 through a valve-restriction pair 9–10 for reservoir 18; 7–8 for reservoir 17; 11–12 for reservoir 16; and 13–14 for reservoir 15. The assembly of these cells, whose heart is chamber 1, bears the general reference A.

A second variable volume chamber 23 also cooperates with a plurality of valves. This combination is referenced B.

This second chamber 23 is combined with a set of two valves 24, 25. This second cell does not comprise any restriction since being coupled mechanically to the eccentric 3 common to the first chamber 1, synchronism of the valves which are associated therewith follows from the synchronism of chamber 1. Such a combination of two assemblies A and B in accordance with the invention, coupled then to a single motor 4 and to a single sensor 5, contributes to the compactness of the circuit. As before, the cell corresponding to the assembly including chamber 1, more especially related to the supply of head T, is referenced B and the cell corresponding to the assembly including chamber 23 is referenced B.

In this configuration, pump B only sucks in air, which results in substantially reducing the torques at the level of the piston, contrary to what happened in the preceding variant where this pump B sucked in a two phase fluid.

A characteristic of this circuit also consists in connecting the reservoir 17, called a buffer reservoir, by means of a duct 220 directly to the recovery gutter 22 and in placing this reservoir 17 under a depression, thus transforming it into a veritible depression accumulator. This improvement avoids pulsed pumping at the level of gutter 22 of a twin phase fluid, which would risk causing ink splashes at the level of this gutter. In addition, a valve 26 is connected on one side to duct 65 and on the other to a condenser 300 having a container for the condensate 301 and a discharge 303 for volatile products, this condenser 300 being also connected to valve 25 through a restriction 31.

FIGS. 10*k* and 10*m* illustrate the circuit portions and the valves concerned. Those which are concerned by the function, for the sequence considered, are shown with continuous lines, the others are shown with dotted lines. When the valve considered is maintained in a constant state (open), the whole of the coil B is shaded and spool t is shown with broken lines. When the valve is successively opened and closed at each half cycle, coil B is half shaded and spool t shown schematically with dark dotted lines.

Only the two steps have been shown corresponding, on the one hand for FIG. 10*k* to the depressurization of reservoir 17 ensuring recovery of the ink from the gutter, via duct 20, and on the other hand for FIG. 10*m* to pumping of the condensate for feeding it into reservoir 17. In fact, the other functions are substantially identical to those already described but which are taken up here again for the sake of clarity.

(a) Maintenance of the pressure of the accumulator 18 during operation of the jet:

When valve 19 is open and jet 21 is present, the volume of ink 34 in accumulator 18, which is subjected to the pressure of the air pocket 180 which it contains, decreases in time, during flow of jet 21, which increases the air volume 180 and results in a pressure drop. Maintenance of the pressure, and so of the volume of ink contained (34), is provided by adding a dose of ink to reservoir 18 coming from reservoir 17, and this through the combination 1, 7, 9 which is caused to operate as a pumping cell, as was explained above particularly with reference to FIG. 1*a* and 1*b*. When reference is made to a dose in the description, it refers to the volume corresponding to that which is generated by piston P in chamber 1 with, for this sequence, the help of valves 7 and 9.

In order to be able to maintain the pressure in reservoir 18, it is necessary to monitor it. This is done periodically during the stopping time T1 of the rotor of the motor, by means of sensor 5. Obviously, this period of measurement is less than that for regenerating ink in reservoir 18. In other words, the successive measurements of the static pressure of reservoir 18 are made at a frequency greater than that of the ink doses which are required for maintaining the pressure in reservoir 18 (flow of the jet).

(b) Measurement of the viscosity of the ink feeding the jet and adjustment of this viscosity as a function of a given reference Keeping the operating parameters constant in time is of prime importance for ensuring high printing quality. The viscosity of the ink must then be regularily monitored so as to be corrected by adding solvent if it is higher than a reference whose value is determined in a way described further on.

The viscosity of the ink is checked regularly using a complete cycle of rotation of the rotor while leaving valve 9 open. The differential pressure $\Delta P$ makes possible the measurement of the viscosity of the ink 34. This viscosity measurement cycle takes place when no addition of ink is required in reservoir 18.

This cycle makes it possible also to homogenize the ink in reservoir 18 when it has just received a dose of solvent, by alternately stirring the ink. Thus, when solvent has just been added to reservoir 18, as well be explained further on, the cycle is repeated several times before serving for measuring the viscosity.

The viscosity of the ink used, apart from any evaporation of solvent, depends on the temperature. Therefore the viscosity reference must take into account the variation of viscosity of the ink as a function of the temperature. For this, the viscosity reference of the ink used is fixed by measuring the viscosity of the new ink in cartridge 15. This measurement is achieved by measuring the differential pressure $\Delta P$ during a cycle of the rotor when valve 13 remains permanently open (FIG. 10*d*). Thus are overcome the constraints associated with the use of different types of ink which have not the same properties as a function of the temperature.

When the viscosity of the ink contained in reservoir 18 is considered too high, a dose of solvent 31 from cartridge 16 is fed into reservoir 18. For this, as shown in FIG. 10*e*, the two valves 11 and 9 are open and cell A by means of 1, 11, 9 operates as a pumping cell.

(c) Measurement of the level in reservoir 17 and addition of ink to reservoir 18:

When addition of ink is required in the reservoir-accumulator 18, the ink is drawn from reservoir 17. The two valves 7 and 9 are open and operate with chamber 1 as a pumping cell. If, during this addition, an intake of air is detected (reservoir 17 empty) in the form of a defect of the differential pressure diagram appearing at the terminals of restriction 8, during the suction half cycle, then the delivery half cycle is carried out by keeping valve 7 open instead of opening valve 9 so as to push the air back into reservoir 17. In the next cycle, with no addition of ink being made and the pressure in reservoir 18 continuing to remain too low, a new addition of ink is carried out, but this time from the ink cartridge 15, using consecutively valves 13 and 9 operating with chamber 1 as a pumping cell.

(d) Measurement of the low and empty levels of cartridges 15 and 16:

The removable ink and solvent cartridges 15 and 16 are each formed of a flexible envelope containing the liquid 30 and 31, this flexible envelope being protected by a rigid case.

The flexible envelope containing the liquid (ink or solvent) has the characteristic, because of its form, of being all the less deformable the lower the remaining volume of liquid. This results in the appearance of a depression of liquid in the pockets all the higher the smaller the volume of liquid remaining.

During the cycle for taking ink 30 or solvent 31, the static pressure in the pocket concerned is measured by keeping the corresponding valve 13 or 11 open during the time T1 during which the rotor is stopped. The liquid level 30, 31 in the deformable pockets is considered low when the depression measured is less than a given reference.

An attempt at taking liquid from cartridges 15 and 16, when the corresponding pockets are empty, results in an absence of flow through restrictions 14 and 12. This absence of flow appears on the pressure diagram obtained by a zero differential pressure (flat diagram) which indicates the empty level of the cartridges. An important remark to be made is that, in the case of an empty cartridge, a zero differential pressure due to an nonexistent flow is associated with a static pressure under high depression with respect to the surrounding pressure whereas, in the absence of a cartridge, a zero differential pressure is associated with a static pressure equal to the surrounding pressure.

(e) Suction of the jet by gutter 22 (FIG. 10*k*):

As shown in FIG. 101, the air is pumped into reservoir 17 through valves 24, 25 connected by ducts 67 to the cell 23, which results in depressurizing this reservoir 17. It then plays the role of depression accumulator. Duct 220 connects this depressurized reservoir 17 to gutter 22 so that the ink jet is directly recovered, from this gutter 22, via this duct 220.

As has already been mentioned, such a configuration avoids the risk of splashes, at the level of gutter 22, which may result from pulsed pumping of a twin phase fluid, ink plus air.

(f) Suction of the condensate and recovery thereof in reservoir 17 (FIG. 10*m*):

The air being pumped into reservoir 17 may take with it a not inconsiderable amount of solvent, this is why the whole passes through a condenser 300 in which the solvent is deposited in the form of condensate 301, the air being discharged through the discharge 303 whose orifice is brought as close as possible to gutter 22 so that if there still remain traces of volatile products, the pollution of the environment is reduced as much as possible.

The condensate 301 is reinjected into reservoir 17 by actuating valves 26, 7, coupled to cell 1 through duct 66*a* and 66.

(g) Maintaining the air pocket at the pressure required for operation of the accumulator 18:

So that the reservoir-pressure accumulator 18 plays its role correctly, it is necessary to guarantee a minimum volume of air therein. The free air contained in the reservoir is always subject to slow but certain dissolution in the ink 34 and it is therefore necessary, so as to maintain the efficiency of the pressure accumulator function of reservoir 18, to regularly restore this volume of air. This is made possible by emptying the reservoir of ink, by allowing the outside air to enter into the reservoir if this is under depression (result of a "lack of air" by dissolution in the ink during operation) and by filling it with ink again up to the operating pressure of the jet, this series of operations being carried out before each start up of the jet.

This is done in the following manner. With reservoir 18 under pressure, it is in a first step emptied of its ink by opening both valves 7 and 9 simultaneously, with motor 4 stopped, the pressurized air driving ink 34 into reservoir 17 faster than would a cell operating as a pumping cell whose flow rate is of the same order as that of the jet. The pressure recorded during this emptying is the medium pressure between the pressure in reservoir 18 and the surrounding pressure. As soon as this pressure measured by sensor 5 is practically equal to the surrounding pressure, the motor is again used for creating a pumping function, valve 9 being open during the suction half cycle and valve 7 being open during the delivery half cycle.

This reversed operation is carried out until there is no liquid flow through the restriction 10, which means that reservoir 18 is completely empty. The volume of ink sucked in by the pumping cell has placed reservoir 18 under depression. The ink 34 initially present in reservoir 18 is then contained entirely in reservoir 17.

Valves 9, 26 are then open so as to allow the air to enter freely in reservoir 18.

The last operation consists in taking up again the ink contained in reservoir 17 and placing it again under the pressure of the volume of regenerated air in reservoir 18, by causing the pumping cell to operate, valve 7 being open during the suction half cycle and valve 9 being closed during the delivery half cycle.

(h) Automatic short stop procedure

One of the problems raised by printers using inks with volatile solvents is the drying of the ink whose dry resins often foul up the elements having relatively moving mechanical parts. The valves in particular are the first involved. An ink circuit of the present invention overcomes this problem for it makes it possible to fill all the valves with solvent before stopping of the machine and so, even if the solvent dries, these valves will not be stuck for the solvent has no sticky resins. Such cleaning by using solvent is achieved very simply in as many motor cycles as there are valves to be filled, by taking for each of them during the suction half cycle with valve 11 open, a dose of solvent from cartridge 31 and injecting it into the valve concerned, which is then opened.

This is done for valves 13, 7 and 9 and 26 as well as for valves 24 and 25, for which the solvent is drawn from condenser 300.

(i) Automatic procedure for complete cleaning, long stop or ink change:

The first phase consists in transferring the ink completely from reservoir 17 to reservoir 18 by operating the cell 7, 1 and 9. The second phase consists in letting the ink contained under pressure in reservoir 18 escape through gutter 22 and pumping the remaining ink, if any, through valves 9, and 26 by means of the chamber 1. The third phase consists in transferring the solvent contained in cartridge 31 into reservoir 17 then into reservoir 18. This pressurized solvent is then expelled into gutter 22 after having rinsed the nozzle body of head T. All these operations provide completely automatic rinsing of the assembly of the supply circuit. It is sufficient to correctly control the different valves and to cause the cell groups A and B to operate as pumps.

In a non limitative example of a circuit of the invention, chamber 1 has a generated volume of 0.4 $cm^3$ with a stroke of 1 mm, and chamber 23 a generated volume of 2 $cm^3$ with a stroke of 1 mm. The stepper motor 4 of a power of 20 watts has a rotation cycle T2 of 0.3 seconds and a stopping time T1 of 100 milliseconds. The total overall volume of the ink circuit is close to 500 $cm^3$; that of the reservoir 17 and 18 is of the order of 260 $cm^3$ and that of the removable cartridges 15 and 16 about 500 $cm^3$. The volume of duct 66 must be very small with respect to the volume generated by cell 1. In one embodiment, the chosen ratio is closed to 4. The ducts corresponding to restrictions 14, 12, 8 must have volumes greater than the volume generated by cell 1. In one embodiment, this ratio is 2. Finally, the duct of restriction 10 must be as small as possible.

As has already been mentioned, such a supply circuit of the invention makes it possible to have access to multiple functions although its structure is extremely compact and its operation very simple. It finds its applications particularly in the field of ink jet printing, not only within the field of industrial marking but also in that of office automation.

I claim:

1. A circuit for supplying a continuous ink jet printing head with ink, which comprises at least one cell which includes:

a stepper motor having a rotor;

a pressure sensor;

a variable volume chamber containing said ink, which is connected to said pressure sensor and controlled by said stepper motor;

a plurality of valves connected to said variable volume chamber, each of said values being in communication with a restriction; and means for opening and closing said valves electronically as a function of the position of said rotor of said stepper motor and allowing for opposite directions of movement of the fluid whereby said cell is adapted to accomplish multiple functions wherein said cell comprises:

a stepper motor having a rotor;

a pressure sensor;

a variable volume chamber, which is connected to said pressure sensor and controlled by said stepper motor;

a plurality of valves connected to said variable volume chamber, each of said valves being in communication with a restriction; and means for opening and closing said valves electronically as a function of the position of said rotor of said stepper motor and allowing for opposite directions of movement of the fluid such that said cell is adapted to accomplish multiple functions wherein said cell comprises viscosity measuring means, a valve maintained open for a complete cycle of the rotor of motor, the maximum pressure difference generated at the ends of the restriction corresponding to the open valve leading to measurement of the viscosity of the fluid which flows through said open valve.

2. A cell to be integrated in a hydraulic circuit, which comprises:

a stepper motor having a rotor;

a pressure sensor;

a variable volume chamber, which is connected to said pressure sensor and controlled by said stepper motor;

a plurality of valves connected to said variable volume chamber, each of said valves being in communication with a restriction; and means for opening and closing said valves electronically as a function of the position of said rotor of said stepper motor and allowing for opposite directions of movement of the fluid such that said cell is adapted to accomplish multiple functions wherein said cell comprises viscosity measuring means, a valve maintained open for a complete cycle of the rotor of motor, the maximum pressure difference generated at the end of the restriction corresponding to the open valve leading to measurement of the viscosity of the fluid which flows through said open valve.

* * * * *